US 12,188,571 B2

(12) United States Patent
Nortcliffe et al.

(10) Patent No.: US 12,188,571 B2
(45) Date of Patent: *Jan. 7, 2025

(54) PLUMBING FITTING ACCESSORY

(71) Applicant: AALBERTS INTEGRATED PIPING SYSTEMS LIMITED, Doncaster (GB)

(72) Inventors: Richard Timothy Nortcliffe, Sheffield (GB); Alasdair Worsley, Worksop (GB)

(73) Assignee: AALBERTS INTEGRATED PIPING SYSTEMS LIMITED, Doncaster (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,564

(22) Filed: Feb. 14, 2023

(65) Prior Publication Data

US 2023/0257972 A1 Aug. 17, 2023

(30) Foreign Application Priority Data

Feb. 15, 2022 (GB) ...................... 2202008

(51) Int. Cl.
*F16K 27/12* (2006.01)
*F16K 31/60* (2006.01)
*E03C 1/02* (2006.01)

(52) U.S. Cl.
CPC .............. *F16K 27/12* (2013.01); *E03C 1/021* (2013.01); *F16K 31/607* (2013.01); *Y10T 137/5109* (2015.04)

(58) Field of Classification Search
CPC ... E03C 1/01; E03C 1/02; E03C 1/021; E03C 7/07; E03C 1/023; E03C 2001/026; F16J 15/02; F16J 15/022; F16K 27/00; F16K 27/12; F16K 31/50; F16K 31/504; F16K 31/60; F16K 31/602; F16K 31/607; F16L 55/115–136; F24F 11/84; B08B 9/0321; B08B 2209/032; F25B 45/00; F25B 2345/006; Y10T 137/5109
USPC ... 137/15.08, 15.17, 15.18, 15.24, 269, 270, 137/271, 371, 377, 381, 382, 382.5, 137/454.2, 454.4, 454.6; 138/89–95
See application file for complete search history.

(56) References Cited

U.S. PATENT DOCUMENTS 149,799 A * 4/1874 Silver ................... F16K 27/045
251/367
753,814 A * 3/1904 Smyser .................. F16K 15/03
137/454.2
2,108,068 A * 2/1938 Allan .................... F16L 55/132
285/125.1

(Continued)

FOREIGN PATENT DOCUMENTS

CN 201517609 U 6/2010
EP 0863347 A1 9/1998

*Primary Examiner* — Kenneth Rinehart
*Assistant Examiner* — J. J. W.
(74) *Attorney, Agent, or Firm* — Notaro, Michalos & Zaccaria P.C.

(57) ABSTRACT

A protective cap for a plumbing fitting is disclosed. The plumbing fitting has a body having a cavity with a flow path extending therethrough. The protective cap comprises a sealing surface. In a first mode the sealing surface is configured to engage with the body to seal the cavity. The protective cap further comprises a receptacle for receiving an actuator. In a second mode the protective cap engages with the actuator of a mechanism fitting within the cavity such that the protective cap forms a handle for the actuator.

14 Claims, 7 Drawing Sheets

(56) References Cited

U.S. PATENT DOCUMENTS

| | | | | |
|---|---|---|---|---|
| 2,763,282 A * | 9/1956 | Reedy | F16L 55/105 | 251/168 |
| 2,913,012 A * | 11/1959 | McCurley | F16L 55/105 | 251/191 |
| 2,975,800 A * | 3/1961 | Doelger | F16K 31/143 | 137/565.14 |
| 3,215,166 A * | 11/1965 | Erich | F16J 15/106 | 73/49.8 |
| 3,240,227 A * | 3/1966 | Burkholder | F16L 41/06 | 285/197 |
| 3,463,195 A * | 8/1969 | Cooke | F16L 41/04 | 138/93 |
| 3,578,285 A * | 5/1971 | Carlton | F16K 1/301 | 251/351 |
| 3,669,139 A * | 6/1972 | Gajdos | F16L 41/04 | 137/317 |
| 3,947,942 A * | 4/1976 | Blocker | F16K 1/308 | 137/15.17 |
| 4,494,565 A * | 1/1985 | Sinclair | F16K 37/00 | 116/277 |
| 4,949,744 A * | 8/1990 | Heed | F16K 7/10 | 73/866.5 |
| 5,106,055 A * | 4/1992 | Phillips | F16K 31/50 | 74/89.26 |
| 5,400,814 A * | 3/1995 | Tigerholm | F16L 41/06 | 83/745 |
| 9,657,862 B1 * | 5/2017 | Andersen | F16K 5/22 | |
| 2007/0012367 A1 * | 1/2007 | Hotz | F16K 37/00 | 251/285 |
| 2015/0198258 A1 * | 7/2015 | Ibsen | F16K 37/0016 | 137/556.6 |
| 2015/0198263 A1 * | 7/2015 | Ibsen | F16K 39/026 | 251/282 |
| 2018/0107231 A1 * | 4/2018 | Svejnoha | G05D 7/0106 | |
| 2021/0071762 A1 | 3/2021 | Whiteley et al. | | |
| 2021/0340741 A1 * | 11/2021 | White | F16K 43/003 | |

* cited by examiner

PLUMBING FITTING ACCESSORY

TECHNICAL FIELD

The present invention relates to a plumbing fitting, and to assemblies, systems and air conditioning units relating thereto.

In particular, but not exclusively, the present invention relates to a plumbing fitting for use with an air conditioning unit, and to an air conditioning unit comprising the plumbing fitting.

BACKGROUND

Plumbing fittings are used for a wide range of domestic and commercial applications, e.g. to regulate fluid flow, direct fluid flow and interact with fluid flow.

Some plumbing fittings of the prior art include a mechanism which is operable to carry out a predetermined function, e.g. flow or pressure regulation. This mechanism may be removeable and arranged in a cavity within the plumbing fitting, when the mechanism is removed an opening is left in the plumbing fitting. This is undesirable as it means the interior of the plumbing fitting may become contaminated, or it may need to be isolated from the plumbing system to stop leaking which requires additional components.

In order to protect the plumbing fitting when the mechanism is not in place, for example during shipping, a protective cap can be placed over the opening. This protective cap is often discarded on installation increasing the waste.

In certain applications it is necessary to remove the mechanism from the plumbing fitting either for maintenance of the component or to flush the plumbing system. In order to do this the cap which seals the mechanism within the fitting must be removed, this requires that any fixing means be released. In the confined spaces where some plumbing fittings can be found removing these fixings, such as bolts, can be difficult and there is a risk that on removal they may become lost.

In some applications it is either necessary or beneficial for the orientation of the mechanism within the fitting to be fixed to ensure the proper operation of the mechanism. It is known to secure the mechanism within the body by means of corresponding threaded portions, allowing the cap and mechanism to be screwed into the body of the plumbing fitting, this method of securing the mechanism within the plumbing fitting results in variation in the orientation of the mechanism.

In certain applications when the mechanism is removed from the plumbing fitting in order to flush the plumbing system, it is replaced by a flushing cap which seals the cavity in which the mechanism is usually held. Flushing the system occurs rarely, therefore there is a risk that the flushing cap may be misplaced.

It is an object of the present invention to provide a plumbing fitting having improvements over those of the prior art.

SUMMARY

According to a first aspect of the invention there is provided a pressure independent control valve (PICV) comprising: a body having a flow path extending therethrough and a cavity within the flow path to releasably receive a mechanism via an aperture; and a cap comprising the mechanism, the cap configured to move between a locked position where the cap is retained on the body and in an unlocked position where the cap is releasable from the body; wherein the cap is retained in the locked position by one or more bayonet fixings.

The use of bayonet fixings to secure the cap has a number of advantages, the alignment of the mechanism with plumbing fitting can be fixed relative to the one or more bayonet fixings, this means a wider range of mechanisms can be used and their tolerances can be improved as the point of entry and exit for the flow path is fixed, not approximate as is the case when the cap is secured by a screw thread on the cap itself. This means the cap can include indicia to indicate the direction of flow within the fitting, allowing easier inspection of the operation of the plumbing fitting.

Additionally, the movement required to remove the cap is reduced which can make singlehanded manipulation easier, a useful characteristic when the fitting can be installed in difficult to access locations.

The bayonet fixings may comprise cooperating features on the cap and body. The cooperating features may comprise at least one projection and at least one corresponding recess. There may be a plurality of projections and corresponding recesses. There may be an equal number of projections and recesses. The at least one projection may be arranged on the body. The at least one recess may be arranged on the cap.

By providing a plurality of projections and corresponding recesses the force applied to keep the cap attached to the body can be distributed around the interface which improves the seal, and it allows the mechanism to be aligned in more than one orientation within the cavity, which is beneficial where the plumbing fitting can be used in more than one mode.

The projection or projections may be formed by any suitable elongate member, such as a pin or bolt or the like. Preferably the elongate member is a partially threaded bolt. By using a partially threaded bolt manufacture of the fitting is simplified as the component can be bought off-the-shelf. The cap may be configured to be secured by tightening the or each bolt.

The projection may be captive. By making the projections captive, that is they can be loosened, but not removed from the body of the plumbing fitting, this is advantageous as it means that when the projections are loosened the risk of them being lost is avoided and the ease at which they can be retighten is increased as it is not necessary to realign them with their threaded hole.

The at least one recess may comprise a stop. The stop may limit the rotation of the cap relative to the body. The at least one recess may comprise a clasp. The clasp may be "C" shaped. The clasp may comprise a recessed seat operable to seat the projection. The clasp may comprise a countersunk seat into which a head of the projection sits when the cap is in the locked position. By providing a stop on the at least one recess the rotational range of the cap relative to the body can be restricted which can help to ensure alignment of the mechanism with the flow path. The provision of a seat in which the projection may sit is further beneficial because it restricts the accidental unlocking of the cap.

When the cap is in the locked position the mechanism may be operatively arranged in the flow path.

The cap may comprise an indicium. The body may comprise at least one indicium. The cap may comprise an indicium and at least one corresponding indicium may be arranged on the body. The indicia may be formed of a groove, recess, slot, or similar feature in the cap and/or body. The indicia may indicate the flow direction of the mechanism. The indica may indicate the position of an input and/or output aperture on the mechanism. The indicia may indicate the position of an input and/or output aperture on the body.

The indium or indicia can be used to ensure than the mechanism is in the correct orientation within the cavity and relative to any indicia.

According to a second aspect of the invention there is provided a kit comprising: a pressure independent control valve (PICV) body comprising: a body having a flow path extending therethrough and a cavity within the flow path to releasably receive a mechanism via an aperture; an operational cap comprising the mechanism, the cap configured to move between a locked position where the cap is retained in the body and in an unlocked position where the operational cap is releasable from the body; wherein the operational cap is retained in the first position by one or more bayonet fixings; a flushing cap, the protective cap configured to move between a locked position where the cap is retained in the body and in an unlocked position where the flushing cap is releasable from the body; wherein the flushing cap is retained in the first position by one or more bayonet fixings; and wherein the aperture is configured to be sealed by either of the flushing cap or operational cap when the respective cap is in the locked position.

When the operational cap is in the locked position the mechanism may be arranged in the flow path.

The kit of the second aspect of the invention may comprise the Pressure Independent Control Valve of the any other aspect of the invention, and/or the optional features thereof. For example, the PICV body of the second aspect may include any or all of the features of the body of the first aspect; and/or the operational cap may comprise any or all of the features of the cap of the first aspect; and/or the flushing cap may comprise any or all of the features of the cap of the first aspect.

According the third aspect of the invention the is provided a method of flushing a pressure independent control valve (PICV), the PICV comprising: a body having a flow path extending therethrough and a cavity within the flow path to releasably receive a mechanism via an aperture; an operational cap comprising the mechanism, the operational cap configured to move between a locked position where the operational cap is retained in the body and in an unlocked position where the operational cap is releasable from the body; wherein the operational cap is retained in the first position by one or more bayonet fixings; a protective cap, the protective cap configured to move between a locked position where the cap is retained on the body and in an unlocked position where the protective cap is releasable from the body; wherein the protective cap is retained in the first position by one or more bayonet fixings;

wherein the method comprises;
moving the operational cap into the unlocked position;
removing the operational cap thereby removing the mechanism from the cavity;
fitting a protective cap over the aperture;
moving the protective cap into the locked position;
supplying fluid through the flow path for a period of time.

The method may further comprise the step of moving the protective cap into the unlock position and removing the protective cap.

The method may further comprise the step of fitting the operational cap such that the mechanism is inserted into the cavity and moving the operational cap into the lock position.

The PICV of the third aspect of the invention may be the PICV of any other aspect of the invention and may include any of the optional features thereof. For example, the body of the third aspect may include any or all of the features of the body of the first aspect; and/or the operational cap may comprise any or all of the features of the cap of the first aspect; and/or the flushing cap may comprise any or all of the features of the cap of the first aspect.

According to a fourth aspect of the present invention there is provided a protective cap for a plumbing fitting; the plumbing fitting comprising a body having a cavity with a flow path extending therethrough and a cavity within the flow path, wherein the protective cap comprises a sealing surface; wherein in a first mode the sealing surface is configured to engage with the body to seal the cavity; wherein the protective cap further comprises a receptacle for receiving an actuator; and in a second mode the protective cap engages with the actuator of a mechanism fitting within the cavity such that the cap forms a handle for the actuator.

By providing the protective cap with a receptacle to receive an actuator the protective cap can further be used as a handle for the actuator thereby removing the need for two different components. It also provides a convenient place to store the protective cap when it is not being used to seal the cavity, being close at hand when required.

The protective cap and actuator may comprise cooperating features. The protective cap may releasably engage with the actuator. The protective cap and actuator may be joined by a snap fitting. The receptacle may be shaped to prevent rotation of the actuator within the receptacle, for example the actuator and receptacle may have a polygonal cross-section or may include one or more cooperating slots and projections.

The mechanism may seal the cavity. The mechanism may form part of an operational cap. The operational cap may seal the cavity.

The protective cap may comprise an indicium. The body may comprise one or more indicia. The operational cap may comprise one or more indicia. By providing an indicium on either or both caps and/or body, the amount the mechanism is varied by can be visualised. The operational cap may comprise a graduated scale. The graduated scale may be indicative of the rate of flow through the mechanism.

The cap may comprise an inner surface and an opposing outer surface. The inner surface may comprise a shoulder for aligning the cap with the body. The shoulder may comprise a first sealing surface. The cavity may be accessible via a cavity aperture. The perimeter of the cavity aperture may comprise a collar to correspond with the shoulder in the cap. The collar may comprise a second sealing surface. The collar may comprise an operational seal. The operational seal may be an O-ring. The operational seal may be arranged in a recess in the collar. The body may further comprise an operational seal to affect the seal between the cap and the body.

In the first mode the protective cap may be secured to the body. The protective cap may be secured to the body by one or more releasable fasteners. The protective cap may be secured to the body by bolts.

The cap may also comprise a spare seal. The spare seal may be arranged on the cap. The spare seal may be the same as the operational seal. The spare seal may be arranged on the outer surface of the cap. The spare seal may be arranged in a recess. The recess may be size to allow storage on the spare seal in a relaxed state.

The mechanism may be a valve, filter, measurement device, or combination thereof. The mechanism may be selected from an anti-back-flow valve, commissioning valve, control valve, pressure independent control valve, serviceable valve, metering valve, balancing valve, regulating valve, mixing valve, thermostatic valve, safety valve, isolation valve, dosing valve, service valve, filtration device, measuring device and combination thereof.

The cap of the fourth aspect of the invention may be the cap of any other aspect of the invention and may include any of the optional features thereof. For example, the cap of the fourth aspect may include any or all of the features of the cap of the first aspect.

According to a fifth aspect of the invention there is provided a method of reconfiguring a plumbing fitting, the plumbing fitting comprising a body having a flow path extending therethrough and a cavity within the flow path, wherein the cavity is accessible via an aperture; wherein the method comprises providing a protective cap engaged with the body of the plumbing fitting and covering the aperture; removing the protective cap from the plumbing fitting; providing an operational cap, the operational cap comprising a mechanism, the mechanism controlled by an actuator extending through the operational cap; inserting the mechanism into the cavity and sealing the aperture with the operational cap; attaching the protective cap to the actuator.

The plumbing fitting of the fifth aspect of the invention may be the plumbing fitting of any preceding aspect of the invention including any optional features thereof and/or the cap of the fifth aspect of the invention may be the cap of any preceding aspect of the invention including any optional features thereof.

According to a sixth aspect of the invention there is provided a kit comprising: a plumbing fitting comprising a body having a flow path extending therethrough and a cavity within the flow path; an operational cap comprising an actuator, the operational cap configured to releasably seal the cavity and the actuator configured to switch a mechanism in the plumbing fitting between a first configuration and a second configuration; a protective cap, the protective cap configured to seal the aperture and comprising an engaging element configured to engage with the actuator to facilitate the switching of the plumbing fitting between the first and second configurations.

The plumbing fitting of the sixth aspect of the invention may be the plumbing fitting of any other aspect of the invention including any optional features thereof. The protective cap of the sixth aspect of the invention may be the cap of the any preceding aspect of the invention including any optional features thereof.

The mechanism may be a valve. In the first configuration the valve may be closed. In the second configuration the valve may be fully open. The fully open valve thereby providing a maximum flow rate.

According to a seventh aspect of the invention there is provided a cap for a plumbing fitting, the plumbing fitting comprising a flow path extending therethrough and a cavity within the flow path, wherein the cap releasably seals the cavity; the cap comprising a primary seal configured to seal the interface between the cap and plumbing fitting and a spare seal arranged on an outer surface of the cap.

The seal may be arranged in a recess in the outer surface of the cap.

The cap may be an operational cap. The operational cap may comprise a mechanism for controlling or regulating the flow of fluid through the flow path. The cap may be a protective cap.

The cap of the seventh aspect of the invention may be the cap of any preceding aspect of the invention.

According to an eighth aspect of the invention there is provided a plumbing fitting and a protective cap, the plumbing fitting comprising a body having a cavity with a flow path extending therethrough, wherein the protective cap comprises a sealing surface, wherein in a first mode the sealing surface is configured to engage with the body to seal the cavity, wherein the protective cap further comprises a receptacle for receiving an actuator, and in a second mode the protective cap engages with the actuator of a mechanism fitting within the cavity such that the protective cap forms a handle for the actuator.

The protective cap of the eighth aspect may be the protective cap of any preceding aspect of the invention. The plumbing fitting of the eighth aspect may be the protective cap of any preceding aspect of the invention.

BRIEF DESCRIPTION OF THE DRAWINGS

In order that the invention may be more clearly understood one or more embodiments thereof will now be described, by way of example only, with reference to the accompanying drawings, of which.

DETAILED DESCRIPTION

Figure 1:
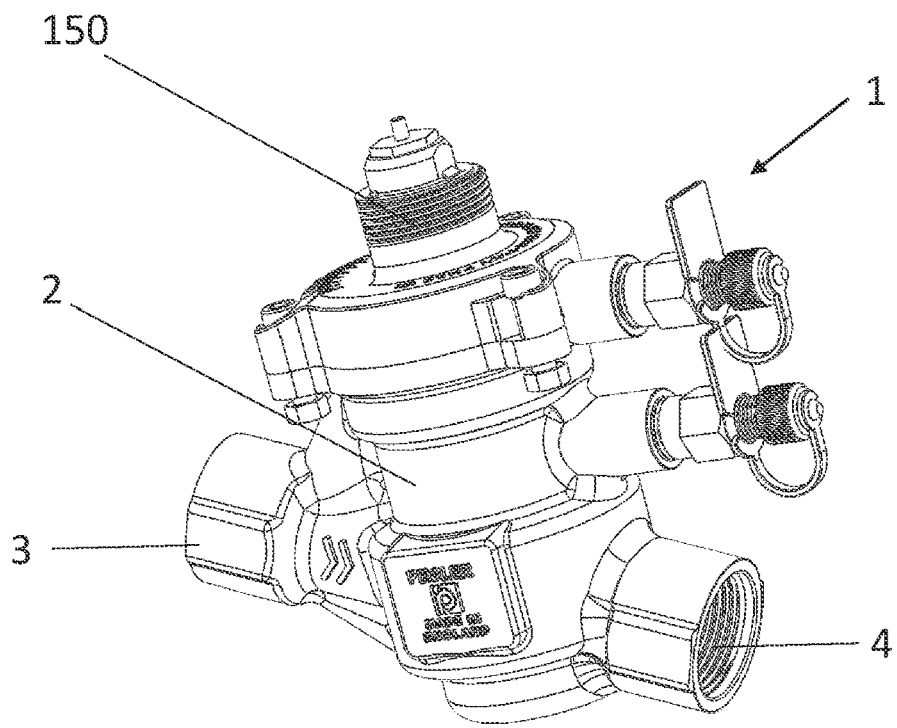
FIG. 1 shows a perspective view of a plumbing fitting with an operational cap according to the present invention.

With reference to FIGS. 1-12, a plumbing fitting 1 comprises a body 2 having an inlet aperture 3 and an outlet aperture 4 disposed on opposing outer sides thereof, arranged co-axially, with their axis at around 30 degrees to the axis of the body 2. The inlet 3 and outlet 4 apertures are adapted to connect to pipes of a plumbing system (not shown). Within the body 2 a cavity 5 is provided, access to which is via a cavity aperture 6 arranged on one end of the body 2. In normal operation a flow path extends though the body 2 from the inlet aperture 3 via the cavity 5 to the outlet aperture 4.

Figure 2:
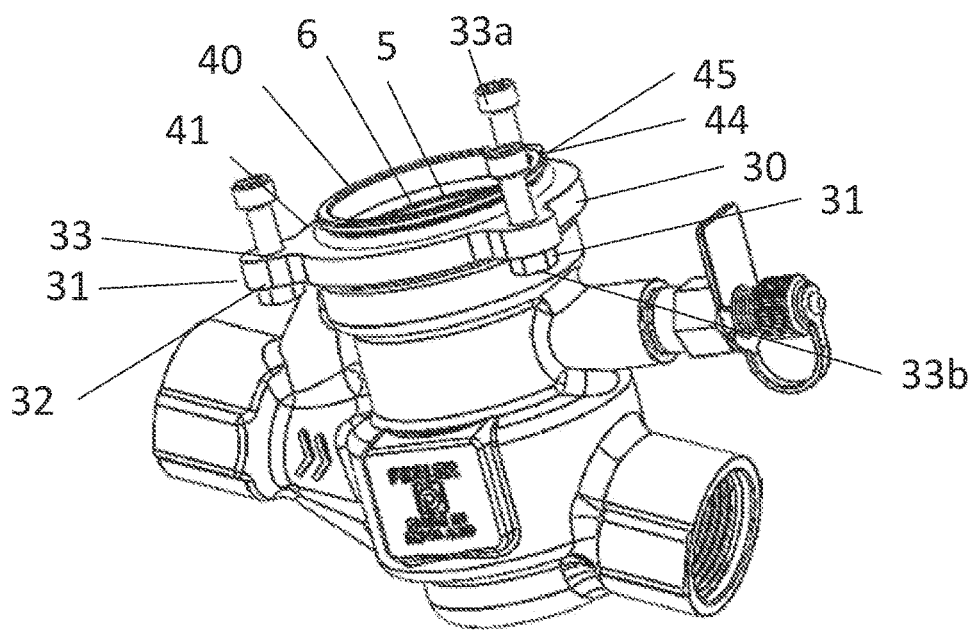
FIG. 2 shows the cap removed from the plumbing fitting of FIG. 1.

As shown in FIG. 2, arranged circumferentially around the body 2 proximate to the cavity aperture 6 is a collar 30 extending radially outward. The collar 30 comprises three wings 31 arranged equidistantly around the collar 30 and projecting radially outwards. Each wing 31 comprises a threaded bore 32 extending through the wing 31 the axis of which is parallel to the axis of the body 2. A partially threaded bolt 33 is provided in each threaded bore 32, the head 33a of each being distal from the body 2, in the head 33a of the bolt a hexagonal recess is provided to allow the bolt to be tightened by a tool. The bolt 33 extends through and beyond the bore 32 with the end terminating with a fixed nut 33b which prevents the bolt 33 from being removed from the bore 32.

An annular projection 40 projects from the perimeter of the cavity aperture 6 along the longitudinal axis of the body 2. The projection 40 is thinner than the remainder of the body 2 so forms a step 41, the projection 40 and step 41 together forming a means of aligning a cap and limiting the extent to which it can be attached as will be described in detail below. On the radially outer surface of the projection 40 proximate to its base a recess 43 is formed, arranged in the recess 43 is an O-ring seal 44. The O-ring 44 and radial outer surface of the projection 42 form a body sealing surface 45.

When the plumbing fitting 1 is configured in a first mode, for example during transport and storage prior to installation, or when the plumbing system is being flushed, the plumbing fitting 1 is provided with a protective cap 50, which may also be referred to after installation as a flushing cap.

Figure 3:
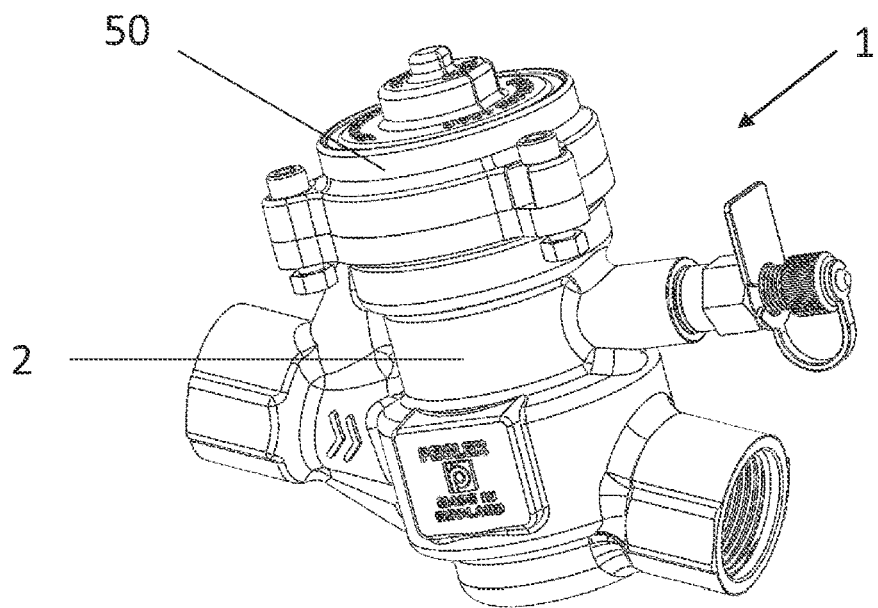
FIG. 3 shows a perspective view of a plumbing fitting with a flushing/protective cap according to the present invention.
Figure 4:
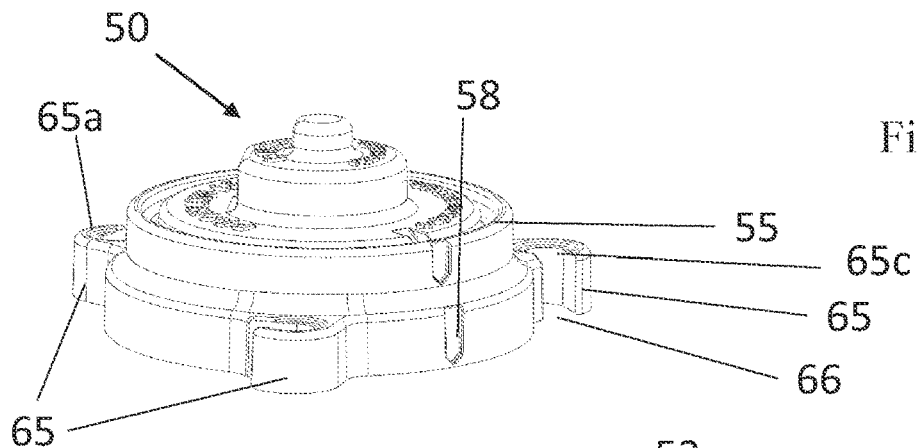
FIG. 4 shows a perspective view of the flushing/protective cap.
Figure 5:
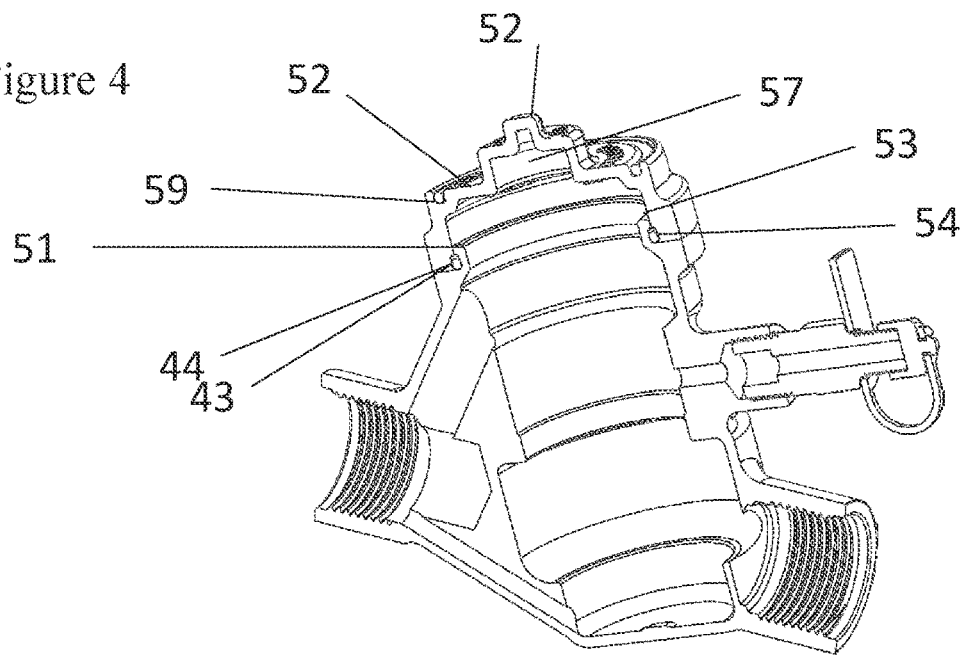
FIG. 5 shows a cross sectional perspective of the plumbing fitting fitted with a flushing/protective cap.

As shown in FIGS. 3, 4 and 5 the protective cap 50 is substantially cylindrical with one open end 51 and one closed end 52. On the inner surface of the cap proximate to the open end 51 is a stepped indent 53 with a larger diameter than the remainder of the interior of the cap. The indent forms the cap sealing surface 54.

On the interior surface of the closed end 52 of the cap a receptacle 57 is formed. The receptacle 57 is shaped the received an actuator as will be described in detail below.

On the outer surface of the closed end 52 of the cap an annular recess 55 is formed, concentrically and radially inwards of the perimeter of the cap 50. The annular recess 55 is configured to receive a spare O-ring 59. The spare O-ring 59 and the O-ring seal 44 as structurally identical, that is the spare O-ring 59 can be used as replacement for the O-ring seal 44 should the need arise.

On the radially outer surface of the cap 50 an indicium 58 is provided in the form of a groove. The indicium 58 is used to visually indicate the configuration of a mechanism within plumbing fitting, as described in greater detail below.

Arranged equidistantly around and projecting radially outward of the radially outer surface of the cap 50 are three clasps 65, into one edge of each clasp a recess 66 is formed such that the clasps 65 have a "C" shaped cross section when viewed along the axis of the body 2. The upper face 65a of the clasp is counter sunk with to provide a seat 65c for the head 33a of the bolt 33. The open portion of the clasp 65 provides a recess 66 into which the bolts 33 can be inserted. Together the bolt 33 and clasp 65 form cooperating features of a bayonet fixing.

When the plumbing fitting 1 is configured in a second, operational, mode, the plumbing fitting 1 further comprises a second, operational, cap 150. Structurally the operational cap 150 is similar to the protective cap 50 with like features sharing the same numbering advanced by 100.

Like the protective cap 50, the operational cap 150 has a substantially cylindrical portion with an open end 151. The inner surface of the cap proximate to the open end 151 is a stepped indent 153 with a larger diameter than the remainder of the interior of the cap. The indent forms the cap sealing surface 154.

Arranged equidistantly around and projecting radially outward of the radially outer surface of the cap 100 are three clasps 165, into one edge of each clasp a recess 166 is formed such that the clasps 165 have a "C" shaped cross section when viewed along the axis of the body 2. The upper face 165a of the clasp is counter sunk with to provide a seat 165c for the head 33a of the bolt 33. The open portion of the clasp 165 provides a recess 166 into which the bolts 33 can be inserted. Together the bolt 33 and clasp 165 form cooperating features of a bayonet fixing.

Inside the operational cap 150 there is provided a mechanism 120 for interacting with the fluid flow path within the cavity 5. It will be understood, however, that the exact details and function of the mechanism are largely irrelevant for the purposes of the invention as this concerns the cap 50,150, and the means by which it engages with the plumbing fitting 1 body 2, it is sufficient that the mechanism 200 is arranged in the cavity, can adjust or regulate the properties of the fluid flow, and that this adjustment or regulation can be controlled externally to the cavity by an actuator 201.

In this embodiment the mechanism is a series of valves which form a pressure independent control valve (PICV) the flow rate of which can be adjusted by the actuator 201. In other embodiments the mechanism may be a valve, such as a ball valve.

Whereas in the protective cap 50 has a closed end 52, the operational cap 150 instead has a second cylindrical portion 155, the second cylindrical portion 155 has a smaller diameter than the open end 151 and forms a tubular conduit 156 through which the actuator 201 passes from the interior side of the operational cap 150 where it is operably connected to the mechanism 200 to the exterior side of the operational cap 150 and is configured to rotate within the tubular conduit 156. The end of the actuator 201 distal from the mechanism 200 is shaped to be received in the recces 57 in the protective cap 50.

As shown in FIGS. 3 and 5, when the plumbing fitting is in the first mode, for example during transport and storage prior to installation, the protective cap 50 is brought to the body 2 such that the annular projection 40 sits within the open end 51 of the cap 50. The clasps 65 are aligned with the bolts 33 such that the bolts 33 sit within the recess 66 of their corresponding clasp 65, the bolts 33 are tightened so that the head 33a sits within the seat 65c of the clasp 65. This brings the cap sealing surface 54 and the body sealing surface 45 together with the O-ring 44 between to seal the cavity aperture 6 to stop any detritus or contamination entering the cavity 5.

Once the plumbing fitting is installed, or just prior to, the protective cap 50 can be removed by a plumbing engineer to be replaced with the operational cap 150 for use in the plumbing system. In order to do this the plumbing engineer first loosens the bolts 33, for example with a Hex Key, such that the heads 33a of the bolts project beyond the seat 65c of their respective clasps 65, the fixed nut 33b limits the amount the bolt can be loosened, the bolts are therefore "captive" which eliminates the risk that the bolts 33 will be lost. The protective cap 50 is then rotated an $\frac{1}{8}^{th}$ of a turn anticlockwise so that the bolts 33 and clasps 65 are no longer superimposed and the protective cap 50 can be removed and retained for later use as described below.

The plumbing engineer can now take an operational cap 150 and place in on the body 2 such that the mechanism 200 is in the cavity and the cap sealing surface 154 is brough together with the body sealing surface 45 with the O-ring 44 between thereby covering the cavity aperture 6 with the operational cap 150. If the orientation of the mechanism 200 within the cavity 5 is relevant to the operation of the fitting, then this can be achieved by aligning a particular bolt 33 with a particular clasp 65, for example by colour coding.

The operational cap 150 is then rotated clockwise such that the bottom of each recess 166 contacts its respective bolt 33, the bolts can then be tightened to force the deformation of the O-ring 44 and ensure a seal fluid tight seal between the body sealing surface 45 and the cap sealing surface 154. By securing the bolts 33 in the seats 165c the operational cap 150 cannot be inadvertently rotated anticlockwise to unlock the cap.

Figure 11:
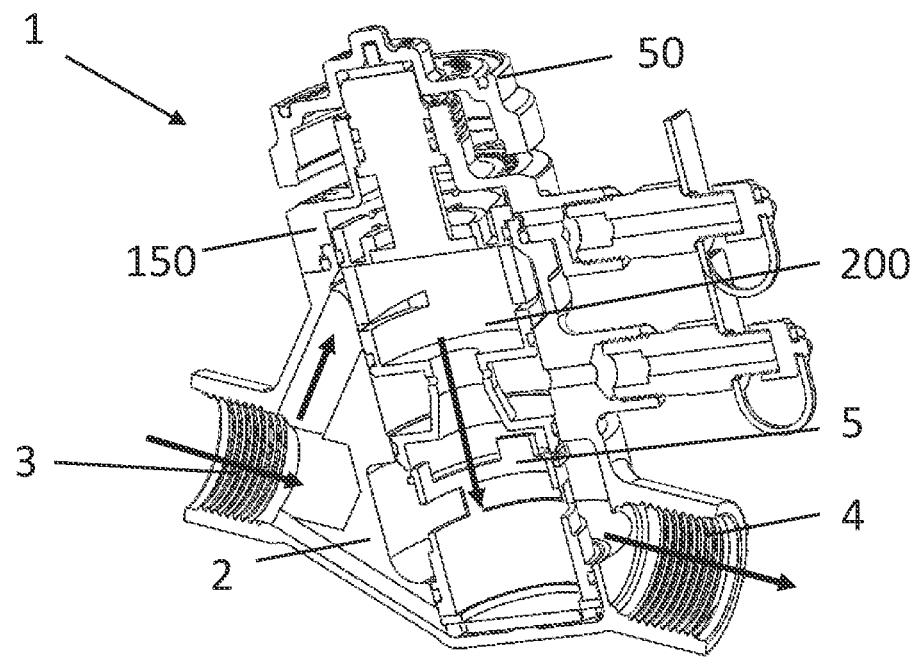
FIG. 11 shows a cross-sectional perspective view of the plumbing fitting showing the flow path of fluid when the plumbing fitting is in an operational configuration.

The plumbing fitting 1 is now in an operational configuration and the fluid can flow through the flow path indicated by the arrows in FIG. 11.

Figure 6:
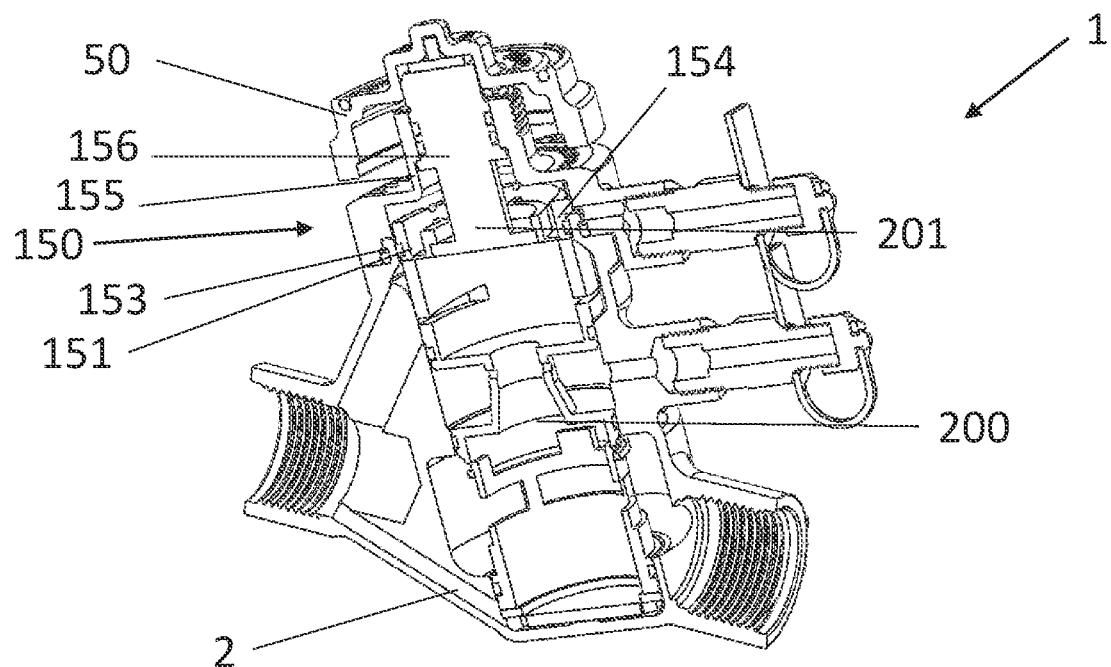
FIG. 6 shows a cross sectional perspective of the plumbing fitting fitted with an operational cap.
Figure 7:
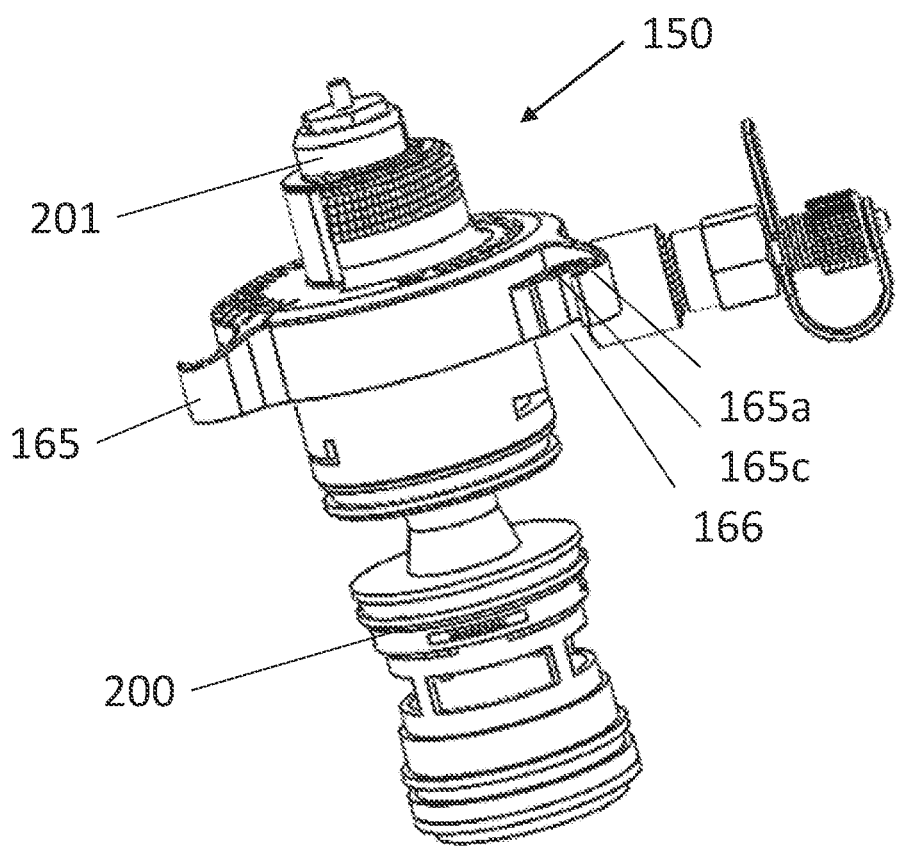
FIG. 7 shows a perspective view of the operational cap.

As shown in FIGS. 6 and 11 to store the protective cap 50 for future use and to provide a handle for manipulating the actuator 201, the protective cap 50 is placed on the distal end 202 of the actuator which is shaped to fit within the receptacle 57 and so that the protective cap 50 does not rotate on the actuator 201, to transfer the rotation through the actuator 201 to vary the configuration of the mechanism 200.

Figure 12:
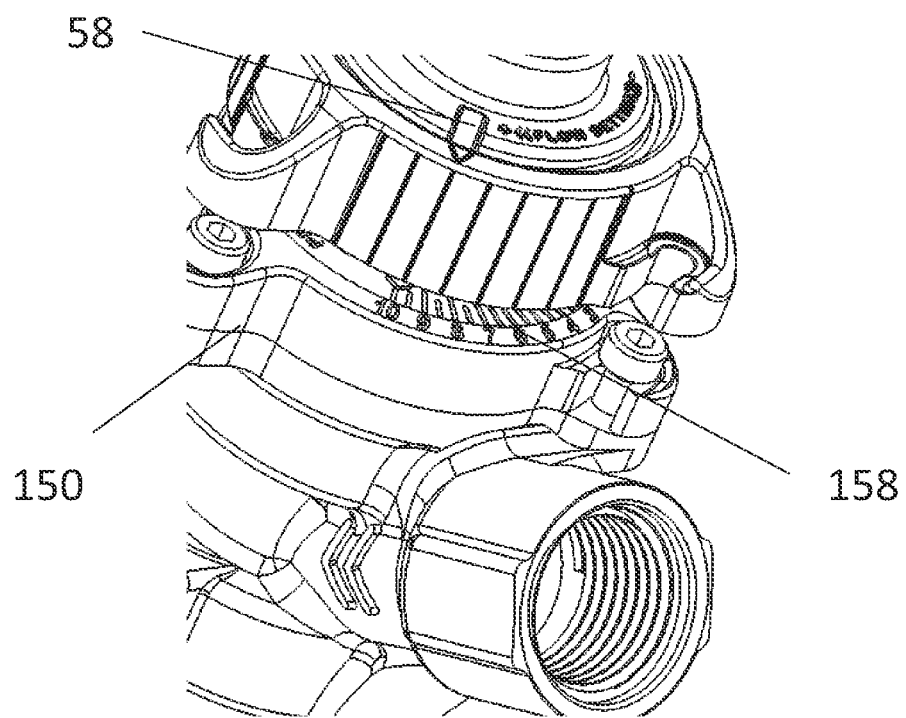
FIG. 12 shows a perspective view of the plumbing fitting fitted with operational and protective caps.

As shown in FIG. 12 an indicium 58 is provided on the protective cap in the form of an arrow or line, corresponding indicia 158 are also provided on the radially outer surface of the operational cap 150. The indicia 158 on the operational cap 150 are provided in the form of a graduated scale. The indicia on the operational cap are arranged such that the graduated scale is indicative of the flow setting through the mechanism 200.

Figure 8C:
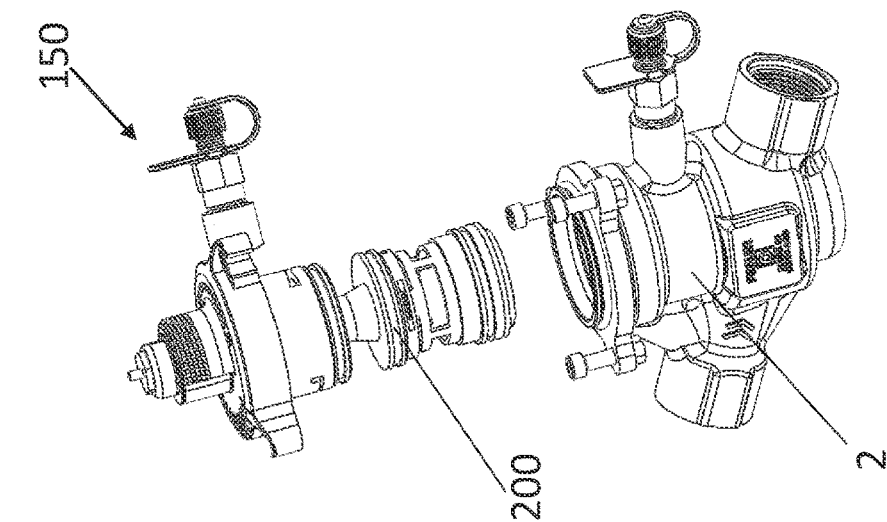
FIGS. 8A-C show the steps of removing the operational cap from the plumbing fitting.
Figure 8B:
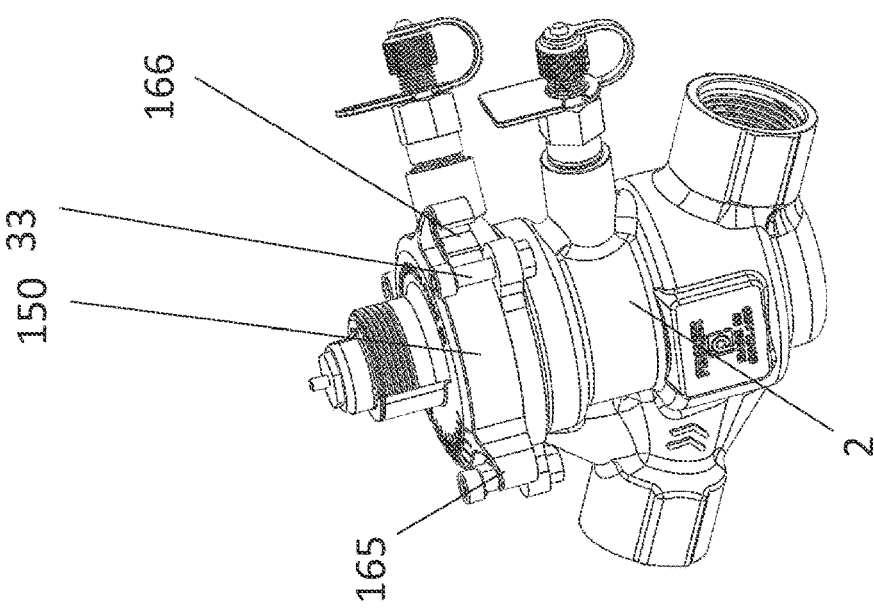
Figure 8A:
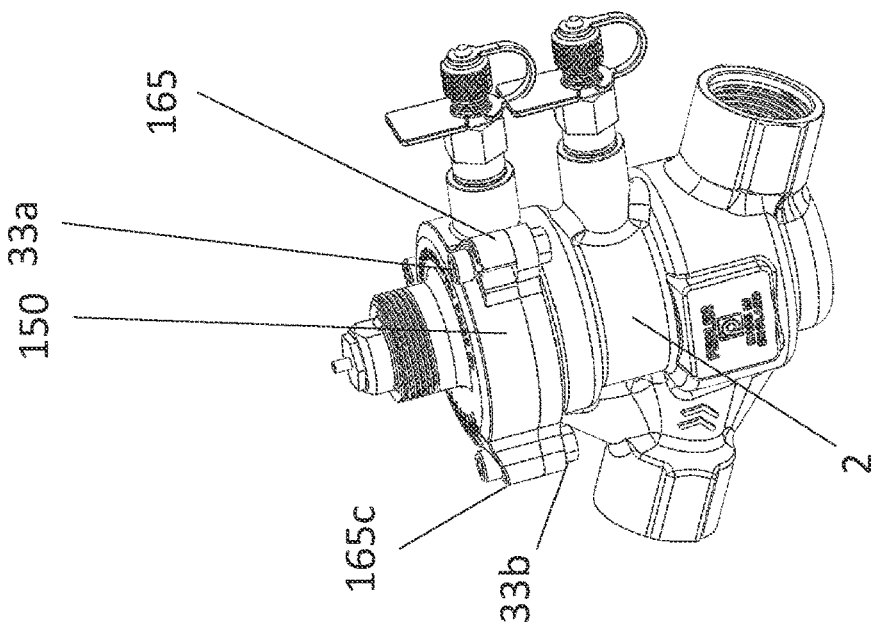

During the lifetime of the plumbing fitting 1 it may be necessary to remove the mechanism 200, this may be so that maintenance can be undertaken on the mechanism 200, or it may be to allow the plumbing fitting 1 to be "flushed", the method of removing the operational cap 150 and thus the mechanism 200 from the body 2 of the plumbing fitting is shown in FIGS. 8A to 8C.

Firstly, the fitting 1 is isolated from the plumbing system, then as shown in FIG. 8A, the bolts 33 are loosened so that the heads 33a of the bolts project beyond the seat 165c in their clasp 165. In order to facilitate this the head 33a includes a Hex socket to engage with a Hex Key, though in other embodiments other means may be provided, for example screw heads or texturing to allow manual gripping. Loosening of the bolts 33 will also release the O-ring seal 44 between the operational cap 150 and the body 2. The extent to which the bolts 33 can be loosened is limited by the fixed nut 33b, this means the bolts 33 cannot be completely removed from the bores 32 and thus cannot be accidentally misplaced.

Subsequently, as shown in FIG. 8B, the cap is rotated anticlockwise, in this embodiment by approximately 20 degrees, such that the bolts 33 are no longer within the recess in the clasp 165, and then as shown in FIG. 8C the operational cap 150 can be removed thereby removing the mechanism 200, the mechanism 200 may be serviced and then replaced by reversing the steps above. Where necessary for the operation of the mechanism the correct rotational orientation can be chosen when placing the operational cap 150, that is the operational cap 150 can be placed to ensure that a particular clasp 165 will engage with a particular bolt 33, for example by colour coding a corresponding pair.

Alternatively, if the plumbing system is to be flushed according to a method known to those skilled in the art, then the operational cap 150 can be removed as described above but instead of, or prior to replacing the operational cap 150 on the fitting 1 the protective cap 50 can be used as a flushing cap and can be fitted according to the following method.

Figures 9A, 9B, 9C:
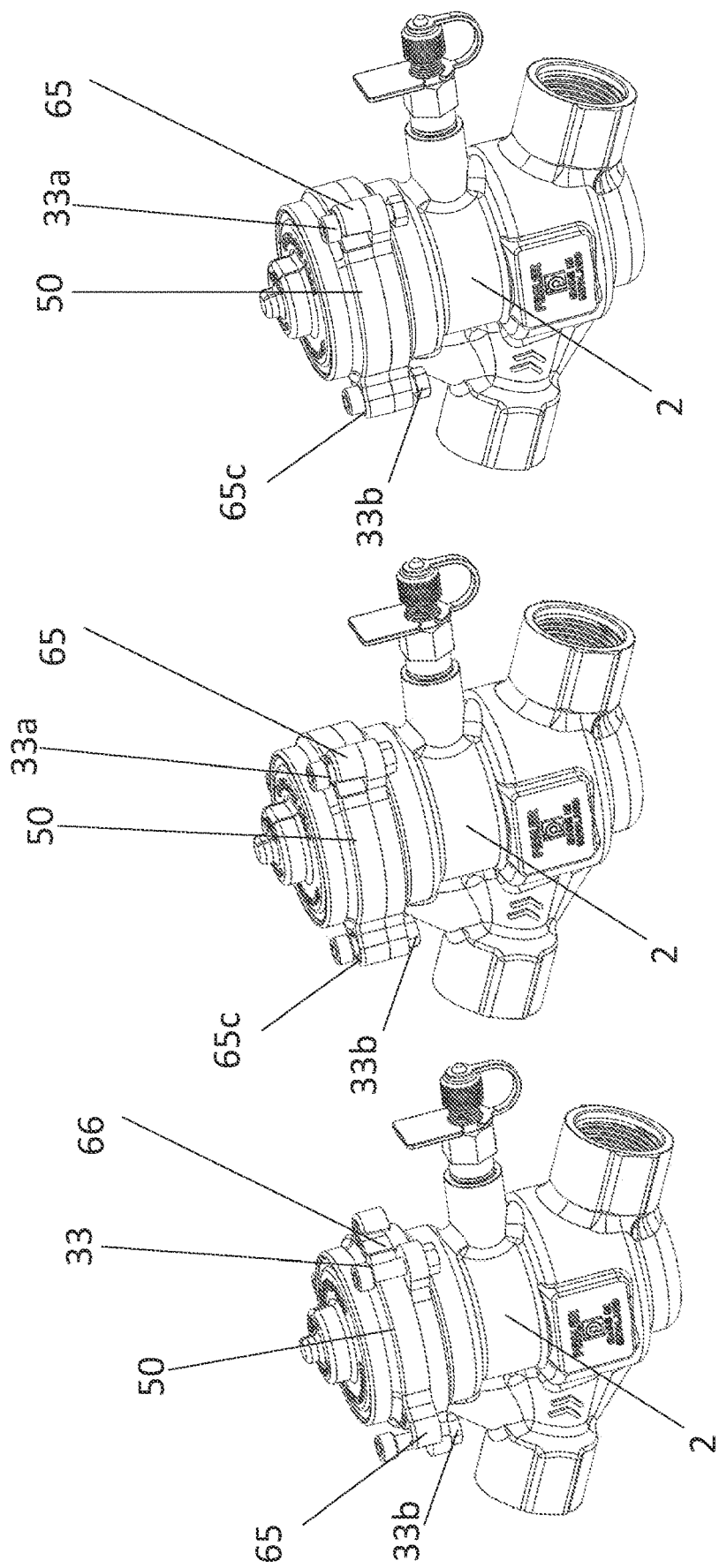
FIGS. 9A-C show the steps of securing the flushing/protective cap to the plumbing fitting.

Referring to FIGS. 9A-C, the flushing cap 50 is placed over the cavity aperture 6 such that the sealing surfaces 45,54 are aligned with the O-ring 44 between. The flushing cap 50 is then rotated clockwise such that bolts 33 sit within the recesses in the clasps 65. Then using a suitable tool, the bolts 33 are tightened so that they head 33a of each sit within the corresponding seat 65c of the clasp 65, the tightening of the bolts 33 results in the O-ring 44 being compressed and affecting a seal between the flushing cap 50 and the body 2, preventing fluid leaking from the cavity 5. By securing the bolts 33 in the seats 115c the flushing cap 50 cannot be inadvertently rotated anticlockwise to unlock the cap.

Figure 10:
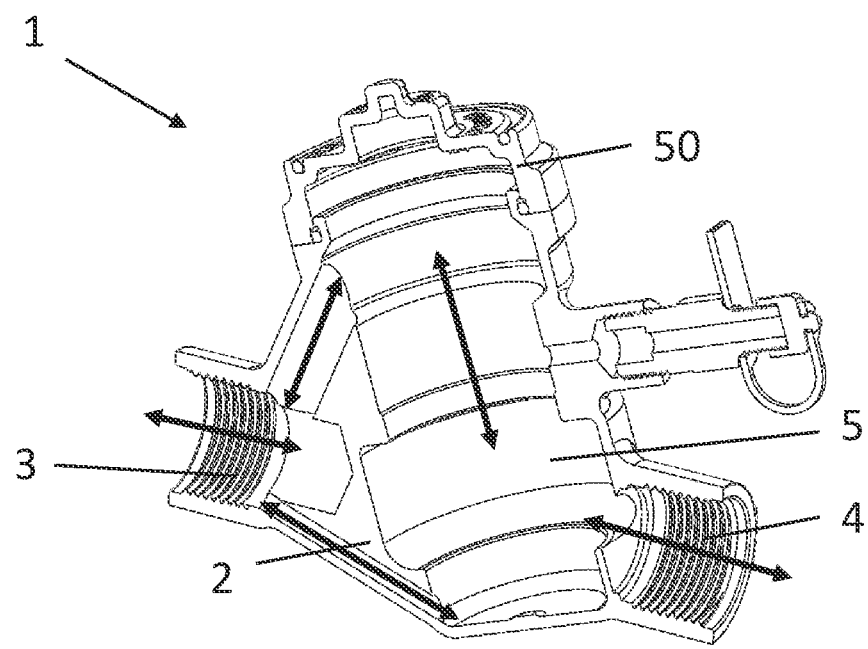
FIG. 10 shows a cross-sectional perspective view of the plumbing fitting showing the flow path of fluid when the plumbing fitting is in a flushing configuration.

The plumbing system can now be flushed as required, with fluid flowing through the plumbing fitting 1 in either direction as shown in FIG. 10.

Once the plumbing system has been suitably flushed, the plumbing fitting 1 can again be isolated from the plumbing system and the flushing cap 110 removed by reversing the above steps and the operational cap 10 reinstalled following the steps outlined above for its initial installation.

The one or more embodiments are described above by way of example only. Many variations are possible without departing from the scope of protection afforded by the appended claims.

What is claimed is:

1. A plumbing fitting and a protective cap;
the plumbing fitting comprising a body having a cavity with a flow path extending therethrough, wherein the protective cap comprises a sealing surface;
wherein, in a first mode, the sealing surface is configured to engage with the body to seal the cavity;
wherein the protective cap further comprises a receptacle for receiving an actuator;
wherein, in a second mode, the protective cap engages with the actuator of a mechanism fitting within the cavity such that the protective cap forms a handle for the actuator; and
wherein an operational cap seals the cavity in the second mode.

2. A plumbing fitting according to claim 1 wherein the mechanism forms part of the operational cap.

3. A plumbing fitting according to claim 1 wherein the protective cap releasably engages with the actuator.

4. A plumbing fitting according to claim 1 wherein the protective cap comprises an inner surface with a shoulder thereof for aligning the protective cap with the body.

5. A plumbing fitting according to claim 4 wherein the shoulder forms the sealing surface.

6. A plumbing fitting according to claim 1 wherein the protective cap further comprises an indicium.

7. A plumbing fitting according to claim 1 wherein the body of the plumbing fitting comprises one or more indicia.

8. A plumbing fitting according to claim 1, the protective cap further comprising a primary seal configured to seal the interface between the sealing surface and the body.

9. A plumbing fitting according to claim 8 wherein the protective cap further comprises a spare seal arranged on an outer surface of the protective cap.

10. A plumbing fitting according to claim 9 wherein the spare seal is arranged in a recess in the outer surface of the protective cap.

11. A plumbing fitting according to claim 1 wherein the mechanism is a valve, filter, measurement device, or combination thereof.

12. A protective cap according to claim 1, wherein the mechanism is selected from an anti-back-flow valve, commissioning valve, control valve, pressure independent control valve, serviceable valve, metering valve, balancing valve, regulating valve, mixing valve, thermostatic valve, safety valve, isolation valve, dosing valve, service valve, filtration device, measuring device and combination thereof.

13. A kit comprising:
- a plumbing fitting comprising a body having a cavity with a flow path extending therethrough;
- an operational cap comprising an actuator, the operational cap configured to releasably seal the cavity and the actuator configured to switch a mechanism in the plumbing fitting between a first configuration and a second configuration;
- a protective cap, the protective cap configured to seal an aperture and comprising an engaging element configured to engage with the actuator to facilitate the switching of the plumbing fitting between the first and second configurations.

14. A method of reconfiguring a plumbing fitting, the plumbing fitting comprising a body having a cavity with a flow path extending therethrough, wherein the cavity is accessible via an aperture;
- wherein the method comprises providing a protective cap engaged with the body of the plumbing fitting and covering the aperture;
- removing the protective cap from the plumbing fitting;
- providing an operational cap, the operational cap comprising a mechanism, the mechanism controlled by an actuator extending through the operational cap;
- inserting the mechanism into the cavity and sealing the aperture with the operational cap;
- attaching the protective cap to the actuator.

* * * * *